US010266252B2

(12) United States Patent
Anderson et al.

(10) Patent No.: US 10,266,252 B2
(45) Date of Patent: Apr. 23, 2019

(54) WING EXTENSION WINGLETS FOR TILTROTOR AIRCRAFT

(71) Applicant: Bell Helicopter Textron Inc., Fort Worth, TX (US)

(72) Inventors: Adam Bryant Anderson, Fort Worth, TX (US); Steven Ray Ivans, Fort Worth, TX (US); Jeremy Robert Chavez, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 285 days.

(21) Appl. No.: 15/269,862

(22) Filed: Sep. 19, 2016

(65) Prior Publication Data

US 2018/0079493 A1 Mar. 22, 2018

(51) Int. Cl.
*B64C 23/06* (2006.01)
*B64C 3/38* (2006.01)
*B64C 29/00* (2006.01)

(52) U.S. Cl.
CPC ............ *B64C 23/072* (2017.05); *B64C 3/385* (2013.01); *B64C 23/069* (2017.05); *B64C 29/0033* (2013.01); *Y02T 50/164* (2013.01)

(58) Field of Classification Search
CPC ..... B64C 3/385; B64C 23/065; B64C 23/072; B64C 23/069; B64C 29/0033
See application file for complete search history.

(56) References Cited

U.S. PATENT DOCUMENTS

| | | | |
|---|---|---|---|
| 1,846,992 A | 2/1932 | Decker | |
| 2,708,081 A | 5/1955 | Dobson | |
| 3,107,882 A | 10/1963 | Matteson et al. | |
| 3,181,810 A | 5/1965 | Olson | |
| 3,666,209 A | 5/1972 | Taylor | |
| 4,245,804 A | 1/1981 | Ishimitsu et al. | |
| 5,096,140 A | 3/1992 | Dornier, Jr. et al. | |
| 5,141,176 A | 8/1992 | Kress et al. | |
| 6,260,793 B1 | 7/2001 | Balayn et al. | |
| 6,276,633 B1 * | 8/2001 | Balayn | B64D 27/00 |
| 6,367,736 B1 | 4/2002 | Pancotti | |

(Continued)

OTHER PUBLICATIONS

European Search Report; Application No. 17191927.7, European Search Report; dated Jan. 24, 2018.

(Continued)

*Primary Examiner* — Philip J Bonzell
*Assistant Examiner* — Tye William Abell
(74) *Attorney, Agent, or Firm* — Lawrence Youst PLLC

(57) ABSTRACT

A pylon assembly for a tiltrotor aircraft includes a rotor assembly operable to rotate between a generally vertical orientation, in a VTOL flight mode, and a generally horizontal orientation, in a forward flight mode, and having an intermediate orientation therebetween, in a conversion flight mode. The rotor assembly includes a proprotor operable to produce a slipstream. A wing extension, positioned outboard of the rotor assembly, has a minimal dimension and an outboard end. A winglet is coupled to the outboard end of the wing extension and has a minimal dimension. The wing extension and the winglet are operable to rotate generally with the rotor assembly such that the minimal dimensions of the wing extension and the winglet remain in the slipstream of the proprotor.

20 Claims, 5 Drawing Sheets

(56) References Cited

U.S. PATENT DOCUMENTS

| | | | |
|---|---|---|---|
| 6,607,161 B1* | 8/2003 | Krysinski | B64C 9/00 244/56 |
| 6,641,365 B2 | 11/2003 | Karem | |
| 7,802,754 B2 | 9/2010 | Karem | |
| 8,083,172 B2 | 12/2011 | Karem | |
| 8,366,049 B2 | 2/2013 | Karem | |
| 8,960,591 B2 | 2/2015 | Pancotti | |
| 9,102,401 B2* | 8/2015 | Collins | B64C 27/28 |
| 2006/0151272 A1 | 7/2006 | Smith et al. | |
| 2009/0266942 A1* | 10/2009 | Karem | B64C 29/0033 244/7 C |
| 2010/0171001 A1* | 7/2010 | Karem | B64C 29/0033 244/7 R |
| 2012/0211608 A1* | 8/2012 | Pancotti | B64C 29/0033 244/7 C |
| 2013/0026302 A1* | 1/2013 | Lee | B64C 27/26 |
| 2013/0099065 A1 | 4/2013 | Stuhlberger | |
| 2014/0061392 A1* | 3/2014 | Karem | B64C 29/0033 244/7 R |
| 2015/0048213 A1* | 2/2015 | Ross | B64C 29/0033 244/7 A |
| 2016/0026190 A1 | 1/2016 | Kowalski et al. | |
| 2016/0122039 A1 | 5/2016 | Ehinger et al. | |
| 2016/0152329 A1* | 6/2016 | Tzeng | B64C 27/37 |

OTHER PUBLICATIONS

Acree, Jr. C.W.; Aerodynamic Limits on Large Civil Tiltrotor Sizing and Efficiency; Fifth Decennial AHS Aeromechanics Specialists' Conference; San Francisco, CA; Jan. 22-24, 2014.

Whittle, Richard; Meet Bell's V-247, Armed Tiltrotor Drone for Marines; Breaking Defense; Aug. 26, 2016.

European Exam Report; Application No. 17191927.7, European Patent Office; dated Feb. 12, 2018.

Canadian Exam Report; Application No. 2,979,607, CIPO; dated Sep. 13, 2018.

European Exam Report; Application No. 17191927.7, European Patent Office; dated Sep. 6, 2018.

* cited by examiner

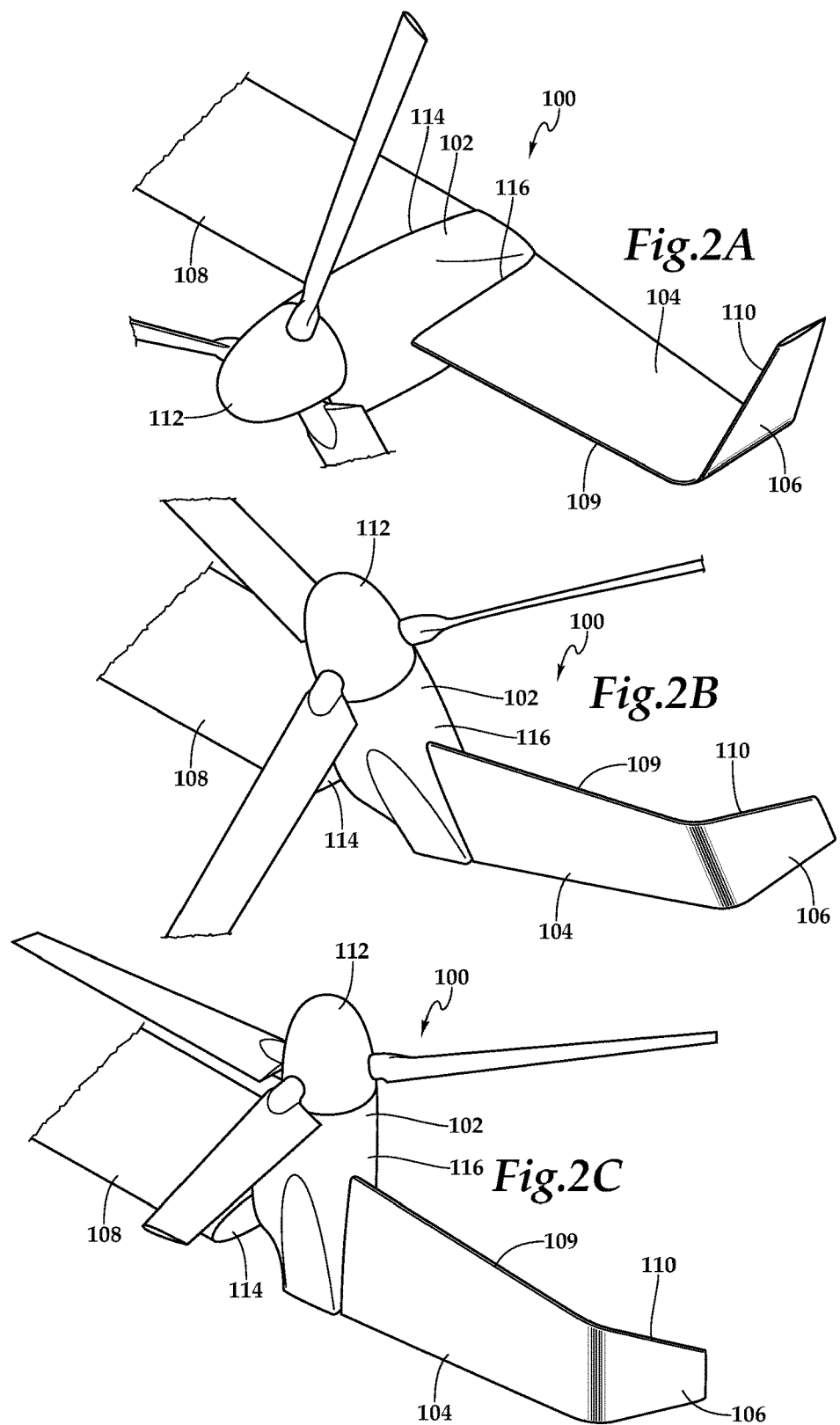

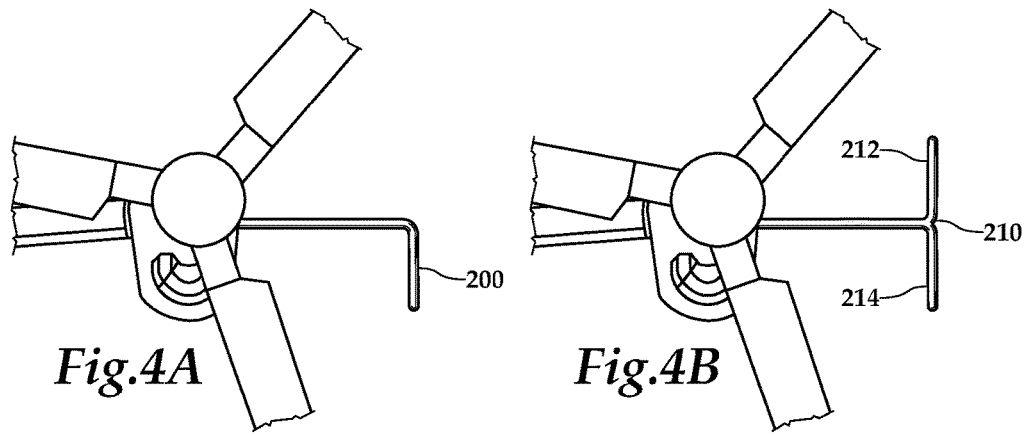
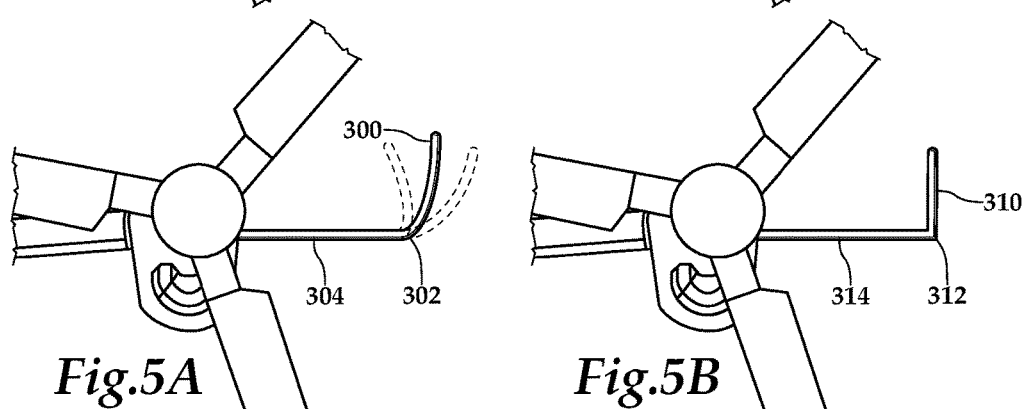
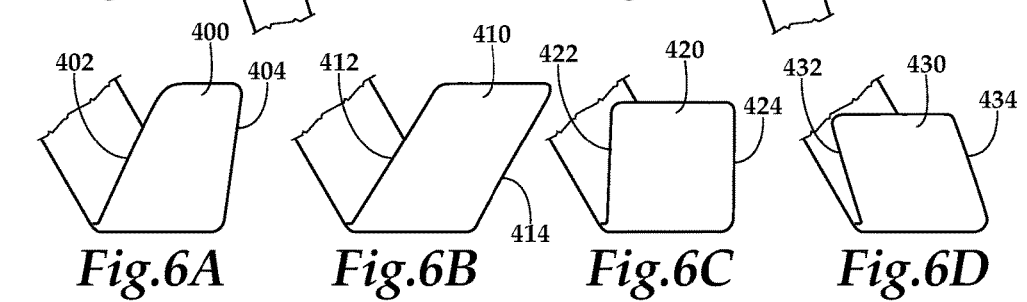
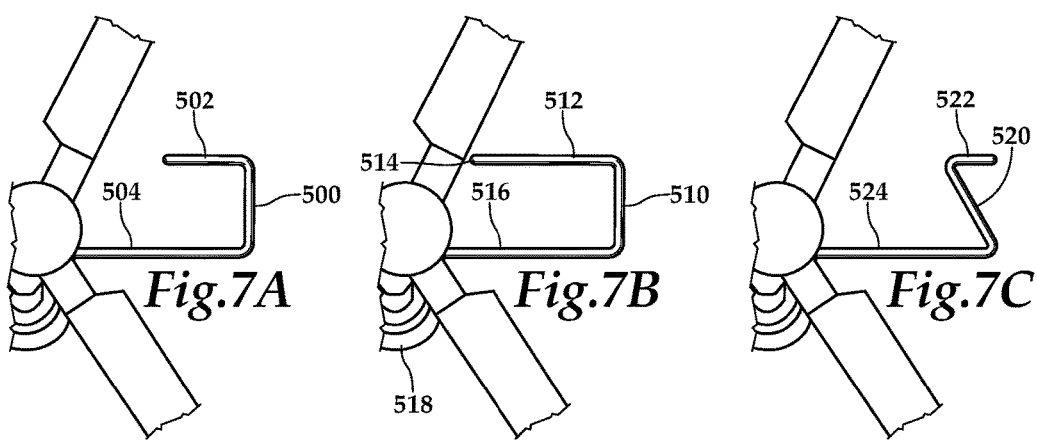

WING EXTENSION WINGLETS FOR TILTROTOR AIRCRAFT

TECHNICAL FIELD OF THE DISCLOSURE

The present disclosure relates, in general, to tiltrotor aircraft having wing extension winglets and, in particular, to tiltrotor aircraft having wing extensions with winglets operable to synchronously rotate with proprotors to reduce the drag experienced by the tiltrotor aircraft in conversion flight mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. In fixed nacelle tiltrotor aircraft, the nacelles are fixed relative to the fixed wing and the proprotors are rotatable relative to the fixed wing and nacelle such that the proprotors have a generally horizontal plane of rotation in a VTOL flight mode and a generally vertical plane of rotation while cruising in a forward flight mode, wherein the fixed wing provides lift and the proprotors provide forward thrust. Tiltrotor aircraft may also achieve forward motion in conversion flight mode, in which the proprotors have an intermediate plane of rotation between generally horizontal and vertical planes of rotation. In this manner, tiltrotor aircraft combine the vertical lift capability of a helicopter with the speed and range of fixed-wing aircraft.

Wing extensions located outboard of the nacelles increase the effective wingspan of the tiltrotor aircraft, which assists cruise efficiency and range. Wing extensions that rotate in synchrony with the proprotors help to reduce download forces on the wing extensions caused by rotorwash from the proprotors. Rotation of the wing extensions, however, may create unwanted drag during forward motion operations in conversion flight mode. Accordingly, a need has arisen to reduce the span of the rotatable wing extensions on tiltrotor aircraft while still maintaining the drag-reducing characteristics of a longer wing extension span.

SUMMARY

In a first aspect, the present disclosure is directed to a pylon assembly for a tiltrotor aircraft including a rotor assembly operable to rotate between a generally vertical orientation, in a VTOL flight mode, and a generally horizontal orientation, in a forward flight mode, and having an intermediate orientation therebetween, in a conversion flight mode. The rotor assembly includes a proprotor operable to produce a slipstream. The pylon assembly includes a wing extension outboard of the rotor assembly. The pylon assembly includes a winglet coupled to the outboard end of the wing extension. The wing extension and the winglet are operable to rotate generally with the rotor assembly such that the minimal dimensions of the wing extension and the winglet remain in the slipstream of the proprotor.

In some embodiments, the winglet may enable drag reduction of the tiltrotor aircraft during forward motion in the conversion flight mode. In such embodiments, the winglet may enable drag reduction of the tiltrotor aircraft during forward motion in the conversion flight mode by enabling the wing extension to have a reduced span. In certain embodiments, the winglet may add a trailing vortex drag-reducing characteristic to the wing extension. In some embodiments, the intermediate orientation of the rotor assembly may be approximately 60 degrees from the generally horizontal orientation. In certain embodiments, the wing extension and the winglet may form an angle of less than or equal to 90 degrees to minimize a forward-facing profile in the conversion flight mode. In some embodiments, the minimal dimensions of the wing extension and the winglet may be forward edges of the wing extension and the winglet, respectively.

In certain embodiments, the rotor assembly has an outboard end and the wing extension may be fixedly coupled to the outboard end of the rotor assembly. In other embodiments, the pylon assembly may include a fixed pylon having an outboard end and an inboard portion, wherein the wing extension is rotatably coupled to the outboard end of the fixed pylon and the rotor assembly is rotatably coupled to the inboard portion of the fixed pylon. In some embodiments, the wing extension and the winglet may be rotatable about a horizontal axis of the tiltrotor aircraft. In certain embodiments, the winglet may be a dihedral winglet, an anhedral winglet, a combination dihedral and anhedral winglet, a forward swept winglet, an aft swept winglet, a C-shaped winglet, a Z-shaped winglet or a box-like winglet. In some embodiments, the transition between the wing extension and the winglet may be angled or curved.

In a second aspect, the present disclosure is directed to a tiltrotor aircraft having a VTOL flight mode, a forward flight mode and a conversion flight mode. The tiltrotor aircraft includes a fuselage and first and second wings supported by the fuselage. First and second pylon assemblies are positioned, respectively, proximate the outboard ends of the first and second wings. Each of the pylon assemblies includes a rotor assembly operable to rotate between a generally vertical orientation, in the VTOL flight mode, and a generally horizontal orientation, in the forward flight mode, and having an intermediate orientation therebetween, in the conversion flight mode. The rotor assembly includes a proprotor operable to produce a slipstream. Each of the pylon assemblies includes a wing extension outboard of the rotor assembly, and a winglet coupled to the outboard end of the wing extension. The wing extension and the winglet are operable to rotate generally with the rotor assembly such that the minimal dimensions of the wing extension and the winglet remain in the slipstream of the proprotor.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2C are isometric views of a rotatable pylon assembly including a winglet for a tiltrotor aircraft in accordance with embodiments of the present disclosure;

FIGS. 4A-4B are front views of wing extensions with winglets in various directional orientations in accordance with embodiments of the present disclosure;

FIGS. 5A-5B are front views of wing extensions with winglets having various transitions in accordance with embodiments of the present disclosure;

FIGS. 6A-6D are isometric views of winglets having various sweeps in accordance with embodiments of the present disclosure; and FIGS. 7A-7C are front views of wing extensions with winglets having various protrusions in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
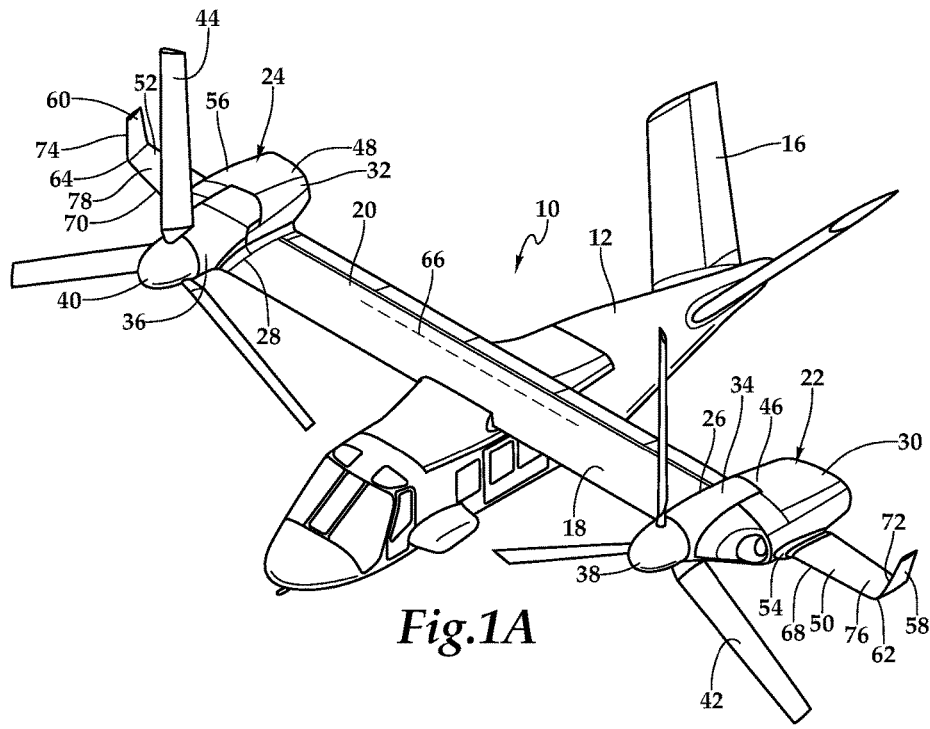
FIGS. 1A-1C are schematic illustrations of a tiltrotor aircraft utilizing winglets in accordance with embodiments of the present disclosure.
Figure 1B:
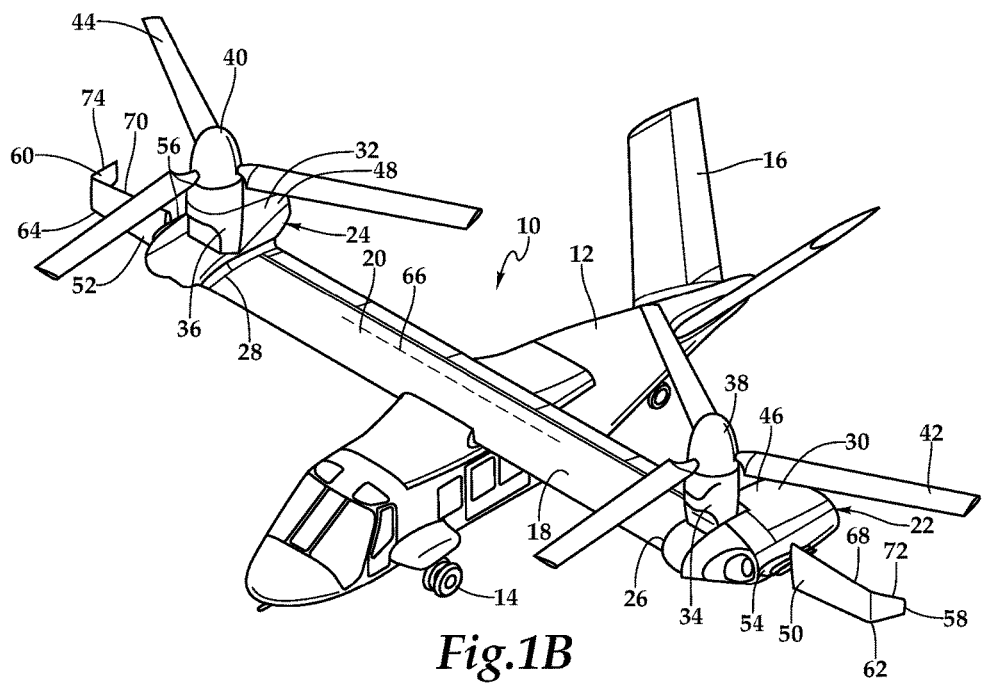
Figure 1C:
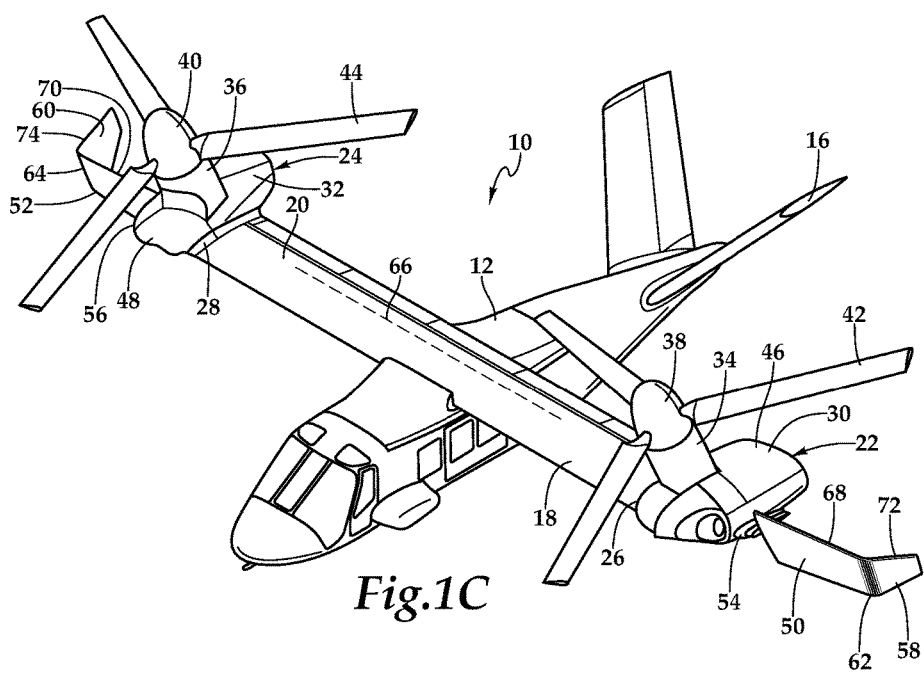

Referring to FIGS. 1A-1C in the drawings, a tiltrotor aircraft is schematically illustrated and generally designated 10. Tiltrotor aircraft 10 includes a fuselage 12, landing gear 14, tail member 16, wings 18, 20 and pylon assemblies 22, 24. Wings 18, 20 are supported by fuselage 12. Pylon assemblies 22, 24 are positioned, respectively, proximate outboard ends 26, 28 of wings 18, 20, and include fixed pylons 30, 32, which are fixedly attached in a generally horizontal orientation to outboard ends 26, 28 of wings 18, 20. Fixed pylons 30, 32 are non-rotatable relative to fuselage 12 and wings 18, 20, respectively. Rotatably mounted within fixed pylons 30, 32 are rotor assemblies 34, 36, which respectively include proprotors 38, 40. Proprotors 38, 40 each include a plurality of proprotor blade assemblies 42, 44, respectively. Rotor assemblies 34, 36 are rotatably coupled to inboard portions 46, 48 of fixed pylons 30, 32. As used herein, the term "coupled" may include direct or indirect coupling by any means, including moving and/or non-moving mechanical connections.

The position of rotor assemblies 34, 36 and the pitch of proprotor blade assemblies 42, 44 are determined using a flight control system to selectively control the direction, thrust and lift of tiltrotor aircraft 10. FIG. 1A illustrates tiltrotor aircraft 10 in airplane mode or forward flight mode, in which proprotors 38, 40 are positioned to rotate in a substantially vertical plane to provide a forward thrust while a lifting force is supplied by wings 18, 20 such that tiltrotor aircraft 10 flies much like a conventional propeller driven aircraft. FIG. 1B illustrates tiltrotor aircraft 10 in helicopter mode or VTOL flight mode, in which proprotors 38, 40 are positioned to rotate in a substantially horizontal plane to provide a lifting thrust such that tiltrotor aircraft 10 flies much like a conventional helicopter. FIG. 1C illustrates tiltrotor aircraft 10 in conversion flight mode, in which proprotors 38, 40 are positioned to rotate in an intermediate plane between the vertical and horizontal planes of the airplane and helicopter modes to provide both a forward and lifting thrust that is useful for certain operations of tiltrotor aircraft 10.

In some embodiments, fuselage 12 may include an engine, transmission and/or gearbox (not shown) to provide torque and rotational energy to proprotors 38, 40 via one or more drive shafts located in wings 18, 20. In these embodiments, pylon assemblies 22, 24 need not include an engine and/or transmission. In other embodiments, each fixed pylon 30, 32 may be a nacelle that includes respective engines, transmissions and/or gearboxes to provide torque and rotational energy to proprotors 38, 40. In yet other embodiments, tiltrotor aircraft 10 may include engines, transmissions and/or gearboxes in both fuselage 12 and fixed pylons 30, 32 that drive proprotors 38, 40. In such a distributed drive system, the engine, transmission and/or gearbox located in fuselage 12 may serve as a backup drive system in the event of failure of either or both of the engines in fixed pylons 30, 32.

Wing extensions 50, 52, which are outboard of rotor assemblies 34, 36, are rotatably coupled to outboard ends 54, 56 of fixed pylons 30, 32, respectively. Wing extensions 50, 52 increase the wingspan and aspect ratio of tiltrotor aircraft 10, thereby increasing the efficiency of tiltrotor aircraft 10 in forward flight, including the capability to fly at a higher altitude for longer ranges with the same fuel load. While spinning, proprotors 38, 40 generate rotorwash, which causes download forces on conventional wing extensions in VTOL flight mode. Such download forces can oppose the lift or thrust generated by proprotors 38, 40, thereby lessening the efficiency of proprotors 38, 40. Thus, as shown in FIGS. 1A-1C, wing extensions 50, 52 may be rotated into a plurality of streamlined positions relative to the airflow generated by proprotors 38, 40, thereby reducing the download forces.

Winglets 58, 60 are coupled to outboard ends 62, 64 of wing extensions 50, 52. Winglets 58, 60 are dihedral. Winglets 58, 60 improve the aerodynamic performance of wings 18, 20 and wing extensions 50, 52 by increasing the effective aspect ratio without significantly increasing the span of wing extensions 50, 52. By reducing the span of wing extensions 50, 52 from what would have been necessary in the absence of winglets 58, 60, the induced drag on wings 18, 20 and wing extensions 50, 52 in forward flight mode is reduced, the structural efficiency of tiltrotor aircraft 10 is improved and the drag caused by wing extensions 50, 52 while moving forward in conversion flight mode is reduced. Winglets 58, 60 improve the lift-to-drag ratio of the total wing of tiltrotor aircraft 10, as compared with wing extensions that lack winglets. Winglets 58, 60 provide the same or similar aerodynamic advantages of a longer higher aspect ratio wing by reducing tip loss, or trailing vortex drag, caused by airflow around the tips of straight wing extensions from the region of high pressure below the wing extension to the region of low pressure above the wing extension. The reduction of tip loss leads to more efficient and faster flight. While longer wing extensions may also reduce tip loss, the increased length of the wing extensions come at the expense of a larger bending moment for wings 18, 20 and a larger spanwise physical footprint of tiltrotor aircraft 10.

In the illustrated embodiment, rotor assemblies 34, 36, wing extensions 50, 52 and winglets 58, 60 are rotatable, in synchrony, between a generally horizontal orientation in forward flight mode, as shown in FIG. 1A, and a generally vertical orientation in VTOL flight mode, as shown in FIG. 1B. In the conversion flight mode shown in FIG. 1C, rotor assemblies 34, 36, wing extensions 50, 52 and winglets 58, 60 are intermediately oriented between the vertical and horizontal orientations shown in FIGS. 1A and 1B. In such an intermediate orientation, rotor assemblies 34, 36, wing extensions 50, 52 and winglets 58, 60 may be tilted anywhere between 0 degrees, which corresponds to the horizontal orientation, and 90 degrees, which corresponds to the vertical orientation, relative to wings 18, 20 and fuselage 12. In the illustrated embodiment of FIG. 1C, rotor assemblies 34, 36, wing extensions 50, 52 and winglets 58, 60 are tilted at approximately 60 degrees relative to wings 18, 20 and fuselage 12 to perform a variety of operations in forward flight that require both lift and thrust forces. It will be appreciated by one of ordinary skill in the art that although rotor assemblies 34, 36, wing extensions 50, 52 and winglets 58, 60 are shown to have congruent tilt angles relative to wings 18, 20 throughout their ranges of motion, rotor assemblies 34, 36, wing extensions 50, 52 and winglets 58, 60 may have tilt angles that differ from one another throughout their respective ranges of motion.

Wing extensions 50, 52 may be actively actuated independently of rotor assemblies 34, 36, or may be directly or indirectly connected, such as via a linkage arm, to rotor assemblies 34, 36 so as to mimic the pitch of rotor assemblies 34, 36, respectively. Rotor assemblies 34, 36, wing extensions 50, 52 and winglets 58, 60 are rotatable about a horizontal axis 66 of tiltrotor aircraft 10. Proprotors 38, 40 produce a generally horizontal slipstream in forward flight mode, a generally vertical slipstream in VTOL flight mode and a slipstream that is intermediate to the horizontal and vertical slipstreams in conversion flight mode. By rotating wing extensions 50, 52 and winglets 58, 60 as illustrated in FIGS. 1A-1C, minimal dimensions 68, 70 of wing extensions 50, 52 and minimal dimensions 72, 74 of winglets 58, 60, as opposed to top and broad surfaces 76, 78 of wing extensions 50, 52, remain in the slipstreams of proprotors 38, 40 in all operational modes, thereby minimizing the download forces on wing extensions 50, 52. In the illustrated embodiment, minimal dimensions 68, 70 are the forward edges of wing extensions 50, 52 and minimal dimensions 72, 74 are the forward edges of winglets 58, 60.

Although winglets 58, 60 have been illustrated in the context of tiltrotor aircraft 10, it will be understood by those having ordinary skill in the art that winglets 58, 60 can be implemented in a variety of ways on a variety of aircraft having tiltable wing extensions including, for example, tiltwing aircraft, quad tiltrotor aircraft, unmanned tiltrotor aircraft and the like. As such, those skilled in the art will recognize that winglets 58, 60 can be integrated into a variety of aircraft configurations having tiltable wing extensions. It is noted that the operation of pylon assembly 22 is substantially symmetric to the operation of pylon assembly 24. Therefore, for the sake of efficiency certain features will be disclosed only with regard to pylon assembly 22. However, one of ordinary skill in the art will fully appreciate an understanding of pylon assembly 24 based upon the disclosure herein of pylon assembly 22.

Referring to FIGS. 2A-2C and 3A-3B in the drawings, a pylon assembly for a tiltrotor aircraft is schematically illustrated and generally designated 100. As shown in FIGS. 2A-2C, rotor assembly 102, wing extension 104 and winglet 106 form substantially congruent and in-phase tilt angles relative to wing 108 while rotating through a range of motion between a generally horizontal orientation in forward flight mode, as shown in FIG. 2A, and a generally vertical orientation in VTOL flight mode, as shown in FIG. 2C, thereby exposing minimal dimensions 109, 110 of wing extension 104 and winglet 106 to the slipstream of proprotor 112. FIGS. 2A-2C show rotor assembly 102, wing extension 104 and winglet 106 forming 0 degree, 60 degree and 90 degree tilt angles, respectively, relative to wing 108. In the illustrated embodiment, pylon assembly 100 is rotatably coupled to the outboard end 114 of wing 108. Wing extension 104 is fixedly coupled to outboard end 116 of rotor assembly 102.

Figure 3A:
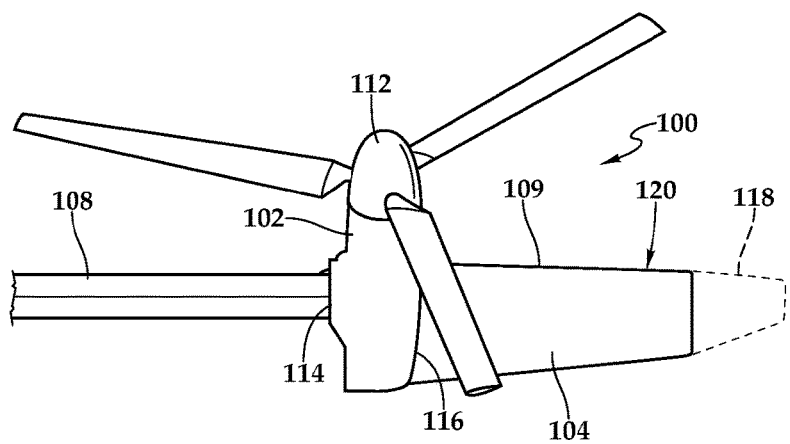
FIGS. 3A-3B are various views of a pylon assembly including a winglet in accordance with embodiments of the present disclosure.
Figure 3B:
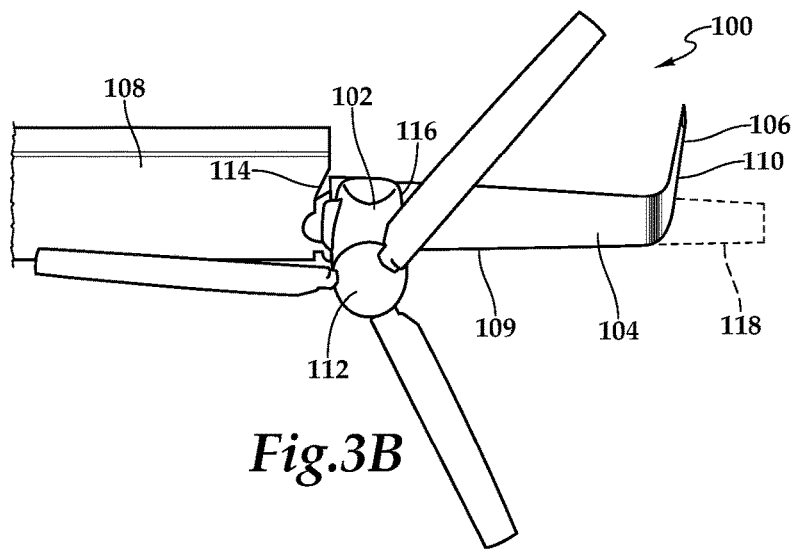

Referring specifically to FIGS. 3A-3B, pylon assembly 100 is shown in conversion flight mode tilted at a 60 degree angle relative to wing 108. The inclusion of winglet 106 enables wing extension 104 to have a reduced span while still providing similar aerodynamic and other attributes of having an increased wing extension span 118. Increased wing extension span 118 is shown in dotted lines because increased wing extension span 118 is not part of the illustrated embodiment, but may be used as a convenient comparison point to show the advantages of winglet 106. The reduced span of wing extension 104, which is enabled by the inclusion of winglet 106, reduces a forward-facing profile 120 of wing extension 104 in conversion flight mode, thereby reducing the drag caused by wing extension 104 during forward motion in the conversion flight mode. Forward-facing profile 120 is less than the forward-facing profile that wing extension 104 would have if it were to include increased wing extension span 118. By including winglet 106 and reducing the span of wing extension 104, a "barn door" drag effect may be avoided as the upwardly-tilted wing extension 104 travels in the forward direction while the tiltrotor aircraft is in conversion flight mode. While the illustrated embodiment shows wing extension 104 and winglet 106 to be tilted 60 degrees relative to wing 108, it will be understood by one of ordinary skill in the art that reducing the span of wing extension 104 reduces the drag caused thereby for any operations in which wing extension 104 and winglet 106 are tilted at an angle between the horizontal orientation shown in FIG. 2A and the vertical orientation shown in FIG. 2C.

In some respects, the inclusion of winglet 106 provides similar aerodynamic advantages of increased wing extension span 118 or a longer higher aspect ratio wing extension, at least in part because winglet 106 has a drag-reducing characteristic that is similar to increased wing extension span 118 in forward flight mode. In particular, winglet 106 reduces tip loss, or trailing vortex drag, in a similar manner as increased wing extension span 118. By eliminating the need for increased wing extension span 118, however, winglet 106 enables wing extension 104 to have a reduced span, thereby causing less drag in forward motion during conversion flight mode. Thus, the use of winglet 106 maintains the effective aspect ratio of the tiltrotor aircraft wing in forward flight mode, while also reducing the frontal drag area, or forward-facing profile, in conversion flight mode. This drag reduction decreases the power required when the tiltrotor aircraft is flying forward while wing extension 104 is tilted upward, such as during short takeoff or flight in conversion flight mode. In the illustrated embodiment, wing extension 104 and winglet 106 form an approximately 90 degree angle to minimize forward-facing profile 120 in conversion flight mode. Wing extension 104 and winglet 106 may also form an acute angle to achieve a similar benefit. While, in some embodiments, wing extension 104 and winglet 106 may form an obtuse angle, such an obtuse angle would increase forward-facing profile 120 of wing extension 104 and winglet 106.

If wing extension 104 were to include increased wing extension span 118, the center of lift for the tiltrotor aircraft moves farther outboard, causing a larger bending moment on wing 108. This larger bending moment requires additional wing support structure that increases the weight of the tiltrotor aircraft. Thus, the inclusion of winglet 106, by reducing the span of wing extension 104, reduces the bending moment, or moment arm, on wing 108, thereby providing structural benefits for the tiltrotor aircraft. The exclusion of increased wing extension span 118 is especially advantageous because increased wing extension span 118 has the longest moment arm along the tiltrotor aircraft's wing structure. Therefore, the reduced wing extension span enabled by winglet 106 reduces potential gust loads in hovering flight and reduces the control authority required to maintain a stable hover. The reduced span of wing extension 104 also conserves space by reducing the physical footprint of the tiltrotor aircraft. A reduced physical footprint may be advantageous when the tiltrotor aircraft is being stored or during operations where space is at a premium, such as aircraft carriers.

Referring to FIGS. 4A-4B, 5A-5B, 6A-6D and 7A-7C in the drawings, winglets having various shapes, sizes and configurations are schematically illustrated. In FIG. 4A, winglet 200 is anhedral. In FIG. 4B, combination dihedral and anhedral winglet 210 has a dihedral portion 212 and an anhedral portion 214. In FIG. 5A, winglet 300 has a curved, or smooth, transition 302 with wing extension 304. Winglet 300 is also shown at various cants to illustrate that a winglet of the illustrative embodiments may have any cant depending on the application. In FIG. 5B, winglet 310 has an angled, or sharp, transition 312 with wing extension 314. In FIG. 6A, winglet 400 is swept slightly aft. In particular, leading edge 402 of winglet 400 is swept aft at an angle greater than trailing edge 404 of winglet 400. The leading and trailing edges 402, 404 of winglet 400 are non-parallel. In FIG. 6B, winglet 410 has leading and trailing edges 412, 414 that are both swept aft at the same rate, and are therefore parallel to one another. In FIG. 6C, winglet 420 has no sweep in either the forward or aft direction, and leading and trailing edges 422, 424 are parallel to one another. In FIG. 6D, winglet 430 is swept forward. In particular, leading and trailing edges 432, 434 are both swept forward at the same rate and are parallel.

In FIG. 7A, winglet 500 has an inward-facing protrusion 502 to form a generally C-shaped winglet with wing extension 504. Inward-facing protrusion 502 reduces the forward-facing profile of wing extension 504, which helps reduce drag when the tiltrotor aircraft moves forward in conversion flight mode, as described above. By tucking inward-facing protrusion 502 behind wing extension 504 while wing extension 504 is tilted upward, inward-facing protrusion 502 produces little or no drag of its own. In FIG. 7B, winglet 510 has inward-facing protrusion 512 that is longer than that shown in FIG. 7A to create a box-like, or extended C-shaped, winglet. In another embodiment, another winglet segment (not shown) may connect an inboard end 514 of inward-facing protrusion 512 to wing extension 516, thereby creating a fully enclosed box-like wing extension outboard of pylon 518. Alternatively, inward-facing protrusion 512 of winglet 510 may extend to and/or couple with the associated pylon assembly, thereby creating a fully enclosed box-like wing extension outboard of pylon 518. In FIG. 7C, winglet 520 is a Z-shaped winglet. In particular, winglet 520 has an outward-facing protrusion 522. In the illustrated embodiment, winglet 520 forms an acute angle with each of wing extension 524 and outward-facing protrusion 522, thereby tucking outward-facing protrusion 522 behind wing extension 524 when wing extension 524 is tilted upward in the conversion flight mode and reducing drag when the tiltrotor aircraft moves in the forward direction. In other embodiments, wing extension 524, winglet 520 and outward-facing protrusion 522 may form perpendicular or obtuse angles relative to one another.

While FIGS. 4A-4B, 5A-5B, 6A-6D and 7A-7C show winglets having many different sizes, shapes and configurations, it will be appreciated by one of ordinary skill in the art that winglets of the present disclosure may have any size, shape or configuration to minimize drag in conversion flight mode and/or induced drag in airplane mode. Winglets of the present disclosure may have any shape, cant, sweep, toe, camber, twist, taper ratio, winglet span, base angle, tip angle, length, width or aspect ratio suitable for the particular application and/or aircraft. Winglets of the present disclosure may also have an elliptical, parabolic, trapezoidal or hyperbolic shape. For example, a winglet may have an elliptical shape based on an ellipse having a major axis that extends vertically and coincides with the intersection of the outer end of the wing extension and the inner end of the winglet. Winglets of the illustrative embodiments may also be used on aircraft in which the lifting rotors remain fixed, as well as aircraft that include or do not include a separate source of propulsion. For example, winglets of the illustrative embodiments may be used on a side-by-side tandem helicopter/hybrid with tilting wing extensions.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A pylon assembly for a tiltrotor aircraft comprising:
a fixed pylon having an outboard end and an inboard portion;
a rotor assembly rotatably coupled to the inboard portion of the fixed pylon, the rotor assembly operable to rotate between a generally vertical orientation, in a VTOL flight mode, and a generally horizontal orientation, in a forward flight mode, and having an intermediate orientation therebetween, in a conversion flight mode, the rotor assembly including a proprotor operable to produce a slipstream;
a wing extension outboard of the rotor assembly, the wing extension having a forward edge and an outboard end; and
a winglet coupled to the outboard end of the wing extension, the winglet having a forward edge;
wherein the wing extension and the winglet form an angle of less than or equal to 90 degrees such that the winglet is substantially noncontributing to the forward-facing profile of the wing extension in the conversion flight mode, thereby reducing drag of the tiltrotor aircraft during forward motion in the conversion flight mode;
wherein the wing extension is rotatably coupled to the outboard end of the fixed pylon such that the rotor assembly and the wing extension are separated by the fixed pylon;
wherein the winglet is dihedral; and
wherein the wing extension and the winglet are operable to rotate in synchrony with the rotor assembly such that the forward edges of the wing extension and the winglet remain in the slipstream of the proprotor.

2. The pylon assembly as recited in claim 1 wherein the winglet enables drag reduction of the tiltrotor aircraft during forward motion in the conversion flight mode.

3. The pylon assembly as recited in claim 1 wherein the winglet enables drag reduction of the tiltrotor aircraft during forward motion in the conversion flight mode by enabling the wing extension to have a reduced span.

4. The pylon assembly as recited in claim 1 wherein the winglet adds a trailing vortex drag-reducing characteristic to the wing extension.

5. The pylon assembly as recited in claim 1 wherein the intermediate orientation of the rotor assembly is in a range between 50 and 70 degrees from the generally horizontal orientation.

6. The pylon assembly as recited in claim 1 wherein the winglet reduces induced drag in the forward flight mode.

7. The pylon assembly as recited in claim 1 wherein the winglet is selected from the group consisting of a combination dihedral and anhedral winglet, a forward swept winglet, an aft swept winglet, a C-shaped winglet, a Z-shaped winglet and a box-like winglet.

8. The pylon assembly as recited in claim 1 wherein a transition between the wing extension and the winglet is selected from the group consisting of an angled transition and a curved transition.

9. The pylon assembly as recited in claim 1 wherein the winglet further comprises a positive dihedral winglet.

10. The pylon assembly as recited in claim 1 wherein the winglet forms a vertical plane.

11. The pylon assembly as recited in claim 1 wherein the winglet forms a vertical plane protruding from the top of the wing extension.

12. The pylon assembly as recited in claim 1 wherein the fixed pylon is interposed between the rotor assembly and the wing extension.

13. The pylon assembly as recited in claim 1 wherein the wing extension and the winglet form an acute angle.

14. The pylon assembly as recited in claim 1 wherein the wing extension is actively actuated independently of the rotor assembly.

15. The pylon assembly as recited in claim 1 further comprising a linkage arm coupling the wing extension to the rotor assembly.

16. The pylon assembly as recited in claim 1 wherein the winglet has a vertical length of at least 20 percent of the horizontal length of the wing extension.

17. The tiltrotor aircraft as recited in claim 1 wherein the fixed pylon houses an engine interposed between the rotor assembly and the wing extension.

18. A tiltrotor aircraft having a VTOL flight mode, a forward flight mode and a conversion flight mode, the tiltrotor aircraft comprising:
a fuselage;
first and second wings supported by the fuselage, the first and second wings each having an outboard end; and
first and second pylon assemblies positioned, respectively, proximate the outboard ends of the first and second wings, each of the pylon assemblies comprising:
a fixed pylon having an outboard end and an inboard portion;
a rotor assembly rotatably coupled to the inboard portion of the fixed pylon, the rotor assembly operable to rotate between a generally vertical orientation, in the VTOL flight mode, and a generally horizontal orientation, in the forward flight mode, and having an intermediate orientation therebetween, in the conversion flight mode, the rotor assembly including a proprotor operable to produce a slipstream;
a wing extension outboard of the rotor assembly, the wing extension having a forward edge and an outboard end; and
a winglet coupled to the outboard end of the wing extension, the winglet having a forward edge;
wherein the wing extension and the winglet form an angle of less than or equal to 90 degrees such that the winglet is substantially noncontributing to the forward-facing profile of the wing extension in the conversion flight mode, thereby reducing drag of the tiltrotor aircraft during forward motion in the conversion flight mode;
wherein the wing extension is rotatably coupled to the outboard end of the fixed pylon such that the rotor assembly and the wing extension are separated by the fixed pylon;
wherein the winglet is dihedral; and
wherein the wing extension and the winglet are operable to rotate in synchrony with the rotor assembly such that the forward edges of the wing extension and the winglet remain in the slipstream of the proprotor.

19. The tiltrotor aircraft as recited in claim 18 wherein, for each pylon assembly, the wing extension and the winglet are rotatable about a horizontal axis of the tiltrotor aircraft.

20. The tiltrotor aircraft as recited in claim 18 wherein each of the winglets is selected from the group consisting of a combination dihedral and anhedral winglet, a forward swept winglet, an aft swept winglet, a C-shaped winglet, a Z-shaped winglet and a box-like winglet.

* * * * *